United States Patent
Yamakawa et al.

(10) Patent No.: US 9,551,868 B2
(45) Date of Patent: Jan. 24, 2017

(54) SCANNING-TYPE PROJECTION DEVICE

(71) Applicant: NIPPON SEIKI CO., LTD., Niigata (JP)

(72) Inventors: Yasuhiro Yamakawa, Niigata (JP); Shun Sekiya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/903,275

(22) PCT Filed: Jul. 14, 2014

(86) PCT No.: PCT/JP2014/068672
§ 371 (c)(1),
(2) Date: Jan. 6, 2016

(87) PCT Pub. No.: WO2015/012138
PCT Pub. Date: Jan. 29, 2015

(65) Prior Publication Data
US 2016/0147062 A1    May 26, 2016

(30) Foreign Application Priority Data

Jul. 26, 2013   (JP) .................................. 2013-156162

(51) Int. Cl.
*H04N 3/08* (2006.01)
*H04N 9/31* (2006.01)
(Continued)

(52) U.S. Cl.
CPC ....... *G02B 27/0101* (2013.01); *G02B 27/0149* (2013.01); *G02B 27/0927* (2013.01);
(Continued)

(58) Field of Classification Search
CPC ............ H04N 3/127; H04N 3/04; H04N 3/06; H04N 3/08; H04N 3/09; H04N 9/3105; H04N 9/3141; H04N 9/31; H04N 9/3197; H04N 9/3161; H04N 9/3129; G09G 3/02; G02B 26/10; G02B 26/12; G02B 27/0101; G02B 27/286; G02B 27/0961; G02B 27/0927; G02B 2027/0118; G02B 2027/0112
(Continued)

(56) References Cited

U.S. PATENT DOCUMENTS 9,134,536 B2 *  9/2015  Sekiya ................... G03B 21/00
2002/0048058 A1  4/2002  Nishikawa et al.
(Continued)

FOREIGN PATENT DOCUMENTS

JP    H07-270711 A    10/1995
JP    2000028957 A    1/2000
(Continued)

OTHER PUBLICATIONS

International Search Report dated Sep. 2, 2014, received in related International Application No. PCT/JP2014/068672, filed Jul. 14, 2014 (translation is provided).

*Primary Examiner* — Sherrie Hsia
(74) *Attorney, Agent, or Firm* — McDermott Will & Emery LLP

(57) ABSTRACT

A scanning-type projection device is provided with an emitted-light-intensity control unit for controlling the light intensity of a laser light emitted by a laser light source unit, a polarization direction control unit for controlling the polarization direction of the laser light, a scanning unit for scanning the laser light and generating a display image, and a divergence unit on which the laser light scanned by the scanning unit is incident. The emitted-light-intensity control unit has a polarization control element for controlling the polarization state of the laser light, and a polarizing plate on which the laser light emitted from the polarization control
(Continued)

element is incident, and the polarization direction control unit adjusts the polarization direction of display light incident on a projection surface by controlling the polarization direction of the laser light emitted by the emitted-light-intensity control unit.

4 Claims, 9 Drawing Sheets

(51) Int. Cl.
*G02B 27/01* (2006.01)
*G02B 27/48* (2006.01)
*G09G 3/00* (2006.01)
*G09G 3/02* (2006.01)
*G02B 27/09* (2006.01)
*G02B 27/28* (2006.01)
*G02B 26/08* (2006.01)
*G02B 26/10* (2006.01)

(52) U.S. Cl.
CPC ....... *G02B 27/0961* (2013.01); *G02B 27/286* (2013.01); *G02B 27/48* (2013.01); *G09G 3/002* (2013.01); *G09G 3/003* (2013.01); *G09G 3/025* (2013.01); *H04N 3/08* (2013.01); *H04N 9/3129* (2013.01); *G02B 26/0833* (2013.01); *G02B 26/10* (2013.01); *G02B 2027/0112* (2013.01); *G02B 2027/0118* (2013.01); *G02B 2027/0154* (2013.01); *G09G 2320/043* (2013.01); *G09G 2320/0666* (2013.01); *G09G 2380/10* (2013.01)

(58) Field of Classification Search
USPC .... 348/203, 744, 792, 793; 345/690; 353/20
IPC ................................................ H04N 3/08,9/31
See application file for complete search history.

(56) References Cited

U.S. PATENT DOCUMENTS

| 2007/0146676 | A1* | 6/2007 | Tanitsu | G02B 26/008 355/71 |
| 2008/0043236 | A1* | 2/2008 | Kaise | G03F 7/70133 356/364 |
| 2013/0003022 | A1* | 1/2013 | Tanaka | G02B 26/108 353/20 |
| 2014/0152711 | A1 | 6/2014 | Sekiya et al. | |
| 2014/0347608 | A1* | 11/2014 | Kato | G02B 27/281 349/96 |

FOREIGN PATENT DOCUMENTS

| JP | 2002131692 A | 5/2002 |
| JP | 2006091489 A | 4/2006 |
| JP | 2006208606 A | 8/2006 |
| JP | 2007523369 A | 8/2007 |
| JP | 2013015738 A | 1/2013 |

* cited by examiner

SCANNING-TYPE PROJECTION DEVICE

CROSS-REFERENCE

This application is the U.S. National Phase under 35 U.S.C. §371 of International Application No. PCT/JP2014/068672, filed Jul. 14, 2014, which claims the benefit of Japanese Application No. 2013-156162, filed Jul. 26, 2013, the entire contents of each are hereby incorporated by reference.

TECHNICAL FIELD

The present invention relates to a scanning-type projection device.

BACKGROUND ART

A scanning-type projection device, which projects vehicle information on a windshield, has been developed such that the vehicle information is displayed on the front side of the windshield of the vehicle in order to enable a driver of the vehicle to read the vehicle information (display image), such as a speed, without moving eyes during driving.

PTL 1 discloses a head up display device in which a scanning-type projection device uses a semiconductor laser as a light source for projecting a display image. The head up display device includes the semiconductor laser, a scanning system and a screen, scans a laser light, which is emitted from the semiconductor laser, toward the screen, and generates the display image.

In the head up display device, in which the laser light is used as the light source, the visibility of the display image is deteriorated due to spectrum based on the laser light. PTL 2 discloses a head up display device which reduces spectrum due to the laser light. In the head up display device disclosed in PTL 2, microlens arrays, which are arranged double, are used. Since the microlens arrays, which are arranged double, diverge the laser light according to a refraction operation performed by a microlens regardless of a diffusing agent and surface unevenness, it is possible to reduce the generation of the spectrum.

In addition, in the head up display, in which the laser light is used as the light source, it is difficult to perform stable display due to the threshold characteristic of the laser light source when an image, in which luminance is low, is displayed. Here, PTL 3 discloses a head up display in which it is possible to stably display an image, in which luminance is low, by arranging a polarization control element and a polarization unit, which causes a laser light having a specific polarization component to pass, on the optical paths of the laser light.

CITATION LIST

Patent Literature

PTL 1: JP-A-7-270711
PTL 2: JP-T-2007-523369
PTL 3: JP-A-2013-15738

SUMMARY OF INVENTION

Technical Problem

In the head up display device disclosed in PTL 2, the beam shape of the laser light should be shaped using a shaping unit (aperture) in accordance with the pixel or the shape of the microlens. In addition, it is necessary to set the arrangement of laser light sources (the polarization direction of the laser light) in accordance with the dependence of the polarization direction of the reflectance of the projection surface of an image. In contrast, in PTL 3, the polarizing surface of the laser light rotates when passing through the polarization control element and the polarization unit, and thus it is necessary to set the arrangement of laser light sources (the polarization direction of the laser light) by taking the rotation of the polarizing surface of the laser light into consideration.

Since the shaping of the beam shape of the laser light and the setting of the polarization direction of the laser light (for example, the arrangement of the laser light sources and the rotation of the polarizing surface) are separately performed, a case occurs in which it is difficult to appropriately set the beam shape of the laser light and the polarization direction of the laser light.

The present invention is provided to solve the above problems, and an object of the invention is to provide a scanning-type projection device which stably displays a low-luminance display image and displays a display image without unevenness of spectrum and luminance.

Solution to Problem

In order to accomplish the above object, the present invention provides a scanning-type projection device which emits a display light to a projection surface and projects a display image expressed by the display light as a virtual image on the projection surface when the display light is reflected in the projection surface, the scanning-type projection device including: a laser light source that emits a laser light; an emitted-light-intensity control unit that is located on the optical path of the laser light, which is emitted from the laser light source, and that controls light intensity of the laser light which is emitted from the laser light source; a polarization direction control unit that is located on the optical path of the laser light, which is emitted from the laser light source, and that controls a polarization direction of the laser light which is emitted from the laser light source; a scanning unit that scans the laser light, which is emitted from the laser light source, and that generates the display image; and a divergence unit to which the laser light scanned by the scanning unit is incident, the emitted-light-intensity control unit includes a polarization control element which controls a polarization state of the laser light, and a polarizing plate to which the laser light emitted from the polarization control element is incident, and the polarization direction control unit adjusts the polarization direction of the display light, which is incident into the projection surface, by controlling the polarization direction of the laser light which is emitted from the emitted-light-intensity control unit.

Advantageous Effects of Invention

According to the present invention, it is possible to stably display a display image, in which the luminance is low, and to display the display image without unevenness of spectrum and luminance.

DESCRIPTION OF EMBODIMENTS (First Embodiment)

A first embodiment of the present invention will be described with reference to FIGS. 1 to 14.

Figure 1:
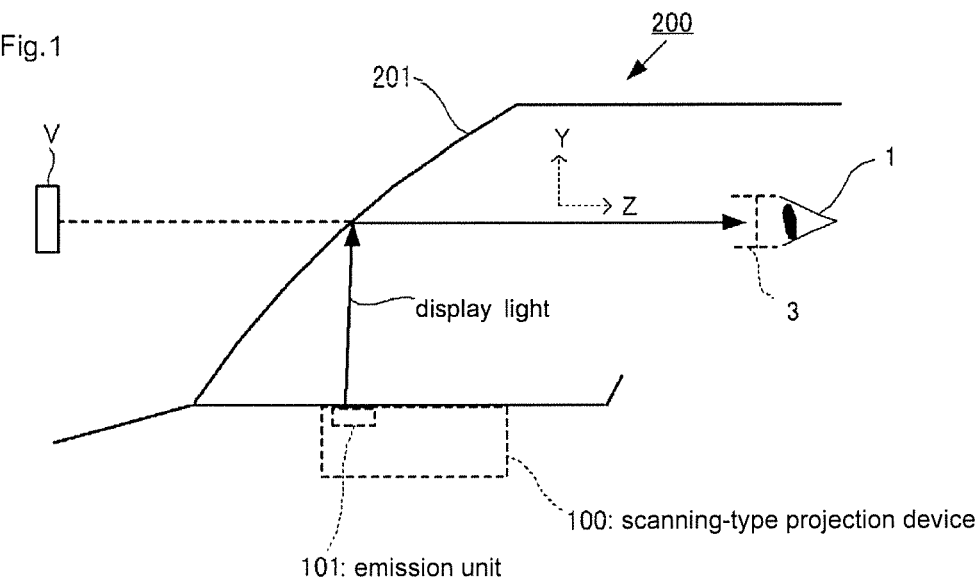
FIG. 1 is a schematic diagram illustrating the outline of a scanning-type projection device according to a first embodiment of the present invention.

FIG. 1 illustrates the outline of a scanning-type projection device 100 according to the embodiment of the present invention. As illustrated in FIG. 1, the scanning-type projection device 100 according to the embodiment is installed in the dashboard of a vehicle 200. The scanning-type projection device 100 emits a display light which expresses a virtual image V of a display image M from an emission unit 101 to a windshield 201 of the vehicle 200. The display light, which is reflected in the windshield 201, reaches eyes 1 of an observer. The observer visually recognizes the virtual image (virtual image projected on the windshield 201) V of the display image M which is expressed by the display light, which is reflected in the windshield 201, in an Eyebox 3 which is a vision. The observer recognizes that the display image M is present in the distant place through the windshield 201.

Figure 2:
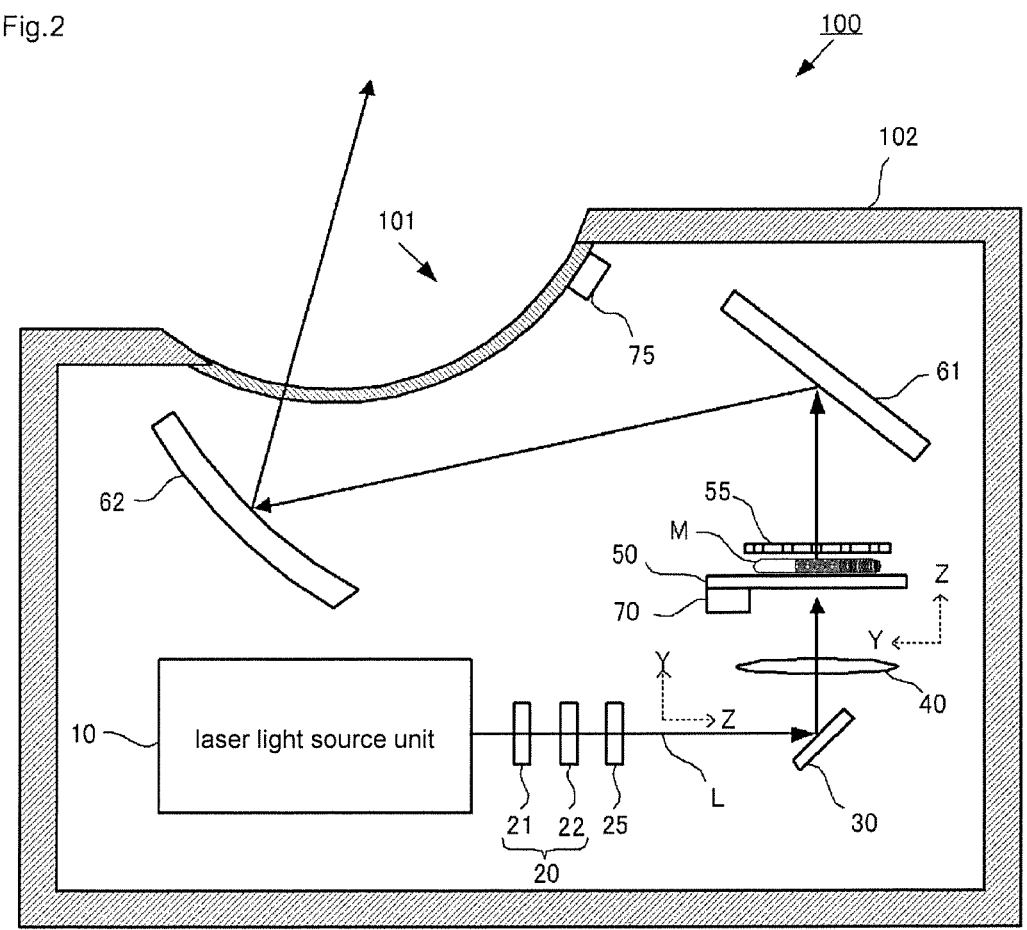
FIG. 2 is a sectional diagram illustrating the outline showing the configuration of the scanning-type projection device according to the first embodiment of the present invention.

FIG. 2 illustrates the outline of a cross section in the vertical direction of the scanning-type projection device 100 in the vehicle 200 (FIG. 1). As illustrated in FIG. 2, the scanning-type projection device 100 includes a laser light source unit 10, an emitted-light-intensity control unit 20, a polarization direction control unit 25, a scanning unit 30, and a refraction unit 40 which are arranged in a housing 102. In addition, the scanning-type projection device 100 includes a microlens array (divergence unit) 50, an aperture array 55, a planar mirror 61, and an enlarging mirror 62.

In the embodiment, a laser light L, which is emitted from the laser light source unit 10, is incident into the emitted-light-intensity control unit 20. The emitted-light-intensity control unit 20 controls the light intensity of the laser light L. The laser light L, which is emitted from the emitted-light-intensity control unit 20, is incident into the polarization direction control unit 25. The polarization direction control unit 25 controls a polarization direction E of the laser light L. The laser light L, which is emitted from the polarization direction control unit 25, is incident into the scanning unit 30. The scanning unit 30 scans the incident laser light L. Here, the travelling direction of the laser light L is set to a Z axis, the right and left directions of the eyes of the observer are set to an X axis (horizontal direction), and a direction, which is perpendicular to the X axis and the Z axis, is set to a Y axis (vertical direction). The scanning unit 30 draws the display image M on the microlens array 50 by scanning the laser light L.

The laser light L, which is scanned by the scanning unit 30, is incident into the refraction unit 40. The refraction unit 40 controls the incidence angle of the laser light L into the microlens array 50. The laser light L, which is emitted from the refraction unit, is incident into the microlens array 50.

The microlens array 50 diverges incident laser light L. Therefore, the microlens array 50 functions as a transmission screen which displays the display image M.

The laser light L (the display light which expresses the virtual image V of the display image M), which is emitted from the microlens array 50, passes through the aperture array 55. The aperture array 55 absorbs stray light in the housing 102, light incident from the outside of the housing 102, or the like, and makes the display light, which expresses the virtual image V of the display image M, to be uniform.

The laser light L which passes through the aperture array 55 (the display light which expresses the virtual image V of the display image M) is sequentially reflected in the planar mirror 61 and the enlarging mirror 62, and is emitted from the emission unit 101 of the housing 102. The laser light L which is emitted from the emission unit 101 (the display light which expresses the virtual image V of the display image M) is incident into the windshield 201. The windshield 201 reflects the incident laser light L (the display light, which expresses the virtual image V of the display image M). The reflected laser light L (the display light which expresses the virtual image V of the display image M) reaches the eyes 1 of the observer.

The detailed configuration of the scanning-type projection device 100 will be described.

(Laser Light Source Unit)

Figure 3:
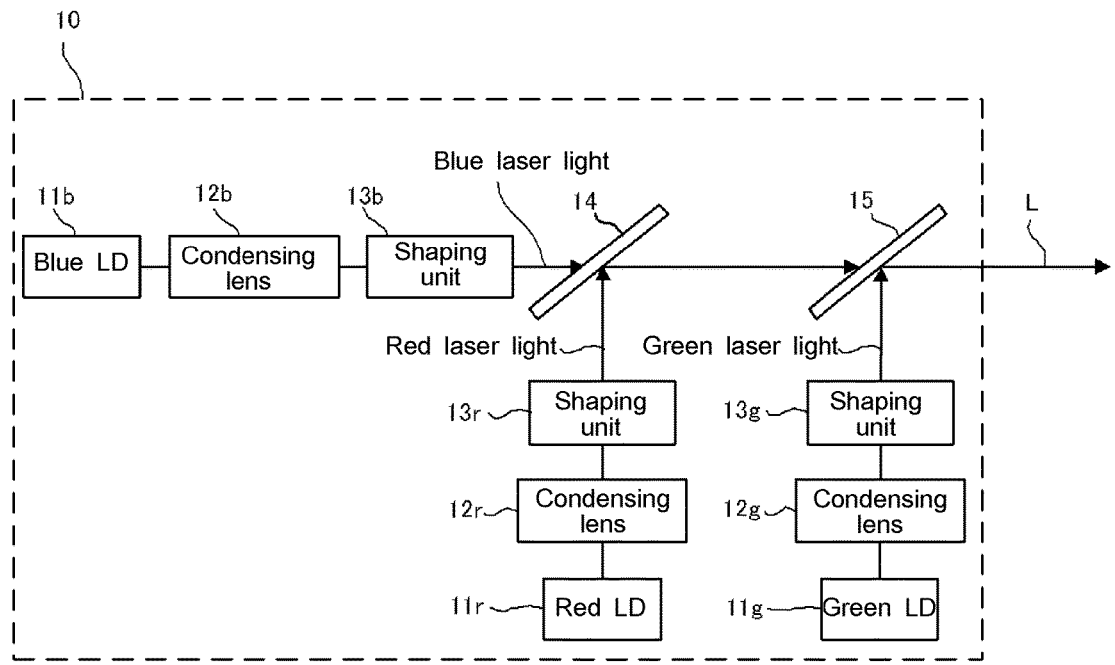
FIG. 3 is a diagram illustrating the configuration of a laser light source unit according to the first embodiment of the present invention.

FIG. 3 illustrates the configuration of the laser light source unit 10. The laser light source unit 10 emits the laser light L by combining R (red), G (green), and B (blue) laser lights. The laser light source unit 10 includes a laser diode (red LD) 11r which emits a red laser light, a laser diode (green LD) 11g which emits a green laser light, and a laser diode (blue LD) 11b which emits a blue laser light. In addition, condensing lenses 12r, 12g, and 12b, which respectively condense the laser lights emitted from a red LD 11r, a green LD 11g and a blue LD 11b, and shaping units 13r, 13g, and 13b, which respectively shape the beam shapes of the respective laser lights, are arranged on the optical paths of the laser lights which are emitted from the respective LDs. Further, the laser light source unit 10 includes dichroic mirrors 14 and 15 which combine the laser lights which are emitted from the red LD 11r, the green LD 11g, and the blue LD 11b.

The red LD 11r, a condensing lens 12r, a shaping unit 13r, the beam cross section shape of the laser light, the intensity distribution of the beam cross section, and a polarization direction E will be described while using an optical system (red laser optical system), which includes the red LD 11r, the condensing lens 12r and the shaping unit 13r, as an example.

Figure 4:
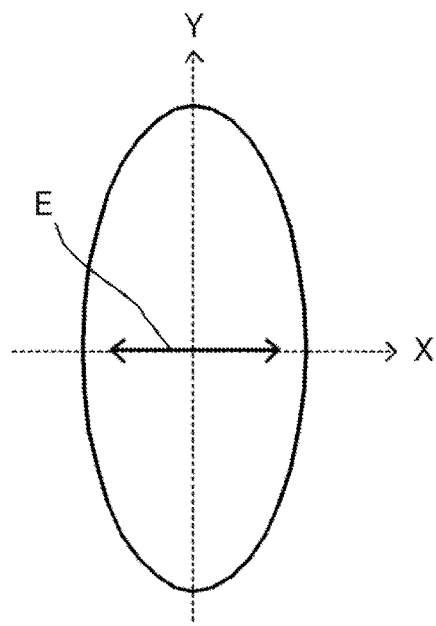
FIG. 4 is a diagram illustrating the beam shape and polarization direction of a red laser light according to the first embodiment of the present invention.

The red LD 11r is arranged such that the beam cross section shape of the emitted red laser light is an elliptical shape which has a long axis in the vertical direction. In this case, the polarization direction E of the red laser light is the short axial direction (X axial direction) of an ellipse as shown in FIG. 4.

The red laser light, which is emitted from the red LD 11r, is incident into the condensing lens 12r. The condensing lens 12r is a lens in which aberration is corrected such that the red laser light, which is emitted from the red LD 11r, is condensed in the prescribed location. That is, the condensing lens 12r converts the laser light, which is emitted from the red LD 11r, from divergence light to convergence light.

Figure 5:
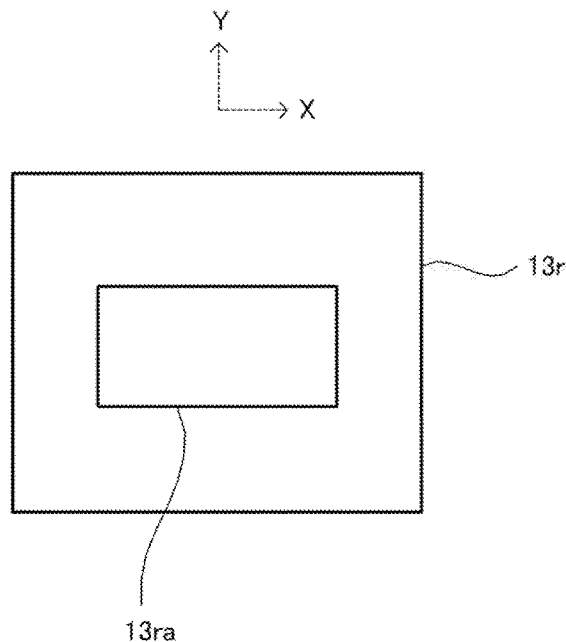
FIG. 5 is a schematic diagram illustrating the configuration of a shaping unit according to the first embodiment of the present invention.

The red laser light, which is emitted from the condensing lens 12r, is incident into the shaping unit 13r. The shaping unit 13r includes an opening 13ra (FIG. 5). The shaping unit 13r is formed of a metal plate or the like. The opening 13ra is, for example, a rectangle which is long in the horizontal direction. Meanwhile, the shape of the opening 13ra is not limited to the rectangle, and may be a shape which shades the ends of the red laser light emitted from the condensing lens 12r in the vertical direction and which does not shade the horizontal direction (shapes only the beam shape in the vertical direction).

The size of the opening 13ra is determined to be a prescribed Numerical Aperture (NA), which will be described later, based on the wavelength of the red laser light, which is emitted from the red LD 11r, and the pitch of the microlens array 50 which will be described later.

Figure 6:
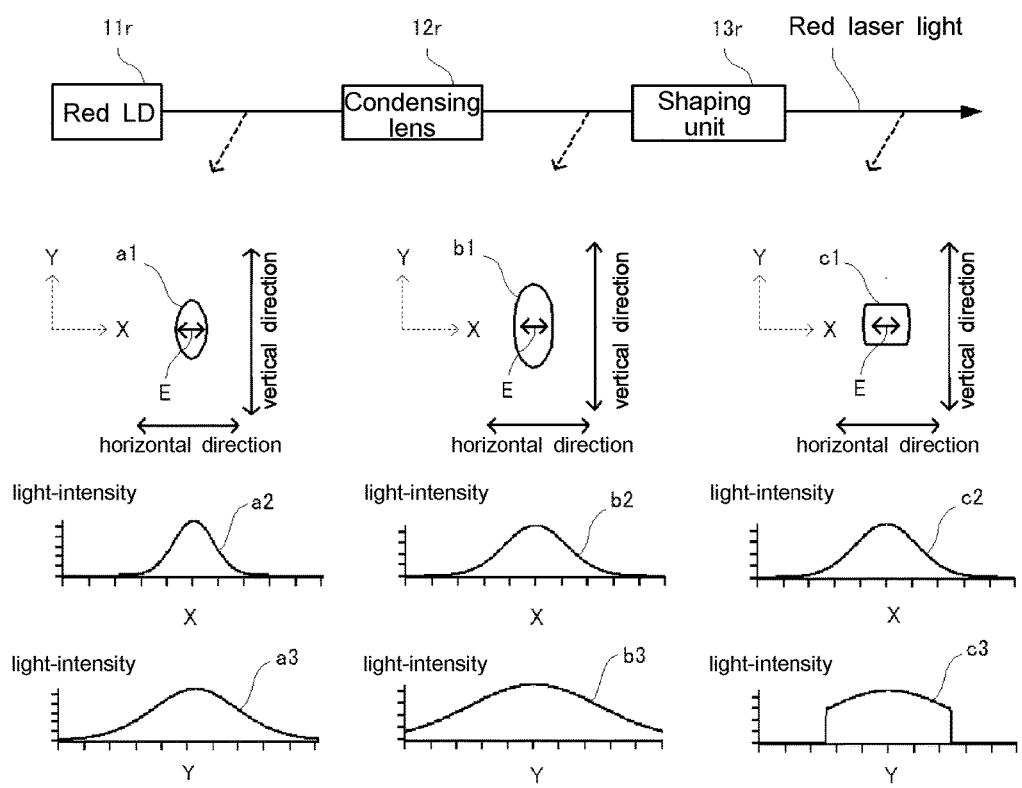
FIG. 6 is a diagram illustrating the beam cross section shape, the intensity distribution of a beam cross section, the change in the polarization direction of the red laser light according to the first embodiment of the present invention.

FIG. 6 is a diagram illustrating the beam cross section shape of the red laser light which is emitted from the red LD 11r, the intensity distribution of the beam cross section, and the change in polarization direction E.

The beam cross section shape of the red laser light which is emitted from the red LD 11r is an ellipse which has a long axis in the vertical direction as described above (FIG. 6: a1). In addition, the intensity distribution of the beam cross section of the red laser light which is emitted from the red LD 11r is viewed as substantially Gaussian distribution in the horizontal direction and the vertical direction (FIG. 6: a2, a3). The polarization direction E of the red laser light which is emitted from the red LD 11r is an X axial direction as shown in FIG. 4 (FIG. 6: a1).

The red laser light, which is incident into the condensing lens 12r, is emitted from the condensing lens 12r as the convergence light. In this case, the beam cross section shape of the red laser light which is emitted from the condensing lens 12r maintains an ellipse which has the long axis in the vertical direction (FIG. 6: b1). In addition, the intensity distribution of the beam cross section of the red laser light which is emitted from the condensing lens 12r maintains substantially Gaussian distribution in the horizontal direction and the vertical direction (FIG. 6: b2 and b3). Further, polarization direction E of the red laser light which is emitted from the condensing lens 12r maintains the X axial direction.

The red laser light, which is emitted from the condensing lens 12r, is incident into the shaping unit 13r, and passes through the opening 13ra. In this case, since the opening 13ra shades the ends of the red laser light emitted from the condensing lens 12r in the vertical direction and does not shade the horizontal direction, the beam cross section shape of the red laser light, which passes through the opening 13ra, has a shape in which the vertical sections of the ellipse shape having the long axis in the vertical direction is decapitated (FIG. 6: c1). In the intensity distribution of the beam cross section of the red laser light, which passes through the opening 13ra, in the horizontal direction, the opening 13ra does not shade the horizontal direction, and thus substantially Gaussian distribution is maintained (FIG. 6: c2). In contrast, since the opening 13ra shades the ends of the vertical direction, both end sections of the Gaussian distribution are lost, and thus the intensity distribution of the red laser light, which passes through the opening 13ra, in the vertical direction of the beam cross section, is seen as the distribution of substantially top hat shape which is substantially uniform (FIG. 6: c3). The polarization direction E of the red laser light, which passes through the opening 13ra, maintains the X axial direction.

The optical system (green laser optical system), which includes the green LD 11g, the condensing lens 12g and the shaping unit 13g, and the optical system (blue laser optical system), which includes the blue LD 11b, the condensing lens 12b and the shaping unit 13b, have the same configuration as the above-described red laser optical system. In addition, the beam cross section shape of the laser light, the intensity distribution of the beam cross section, and the polarization direction E of each of the green laser optical system and the blue laser optical system are the same as in the red laser optical system.

The dichroic mirrors 14 and 15 are mirrors in which a thin film, such as a dielectric multilayer, is formed on a mirror surface. The dichroic mirror 14 is arranged on the optical paths of the red laser light, which passes through the shaping unit 13r, and the blue laser light, which passes through the shaping unit 13b, at a prescribed angle. The dichroic mirror 14 causes the blue laser light to pass and causes the red laser light to be reflected. Therefore, the red laser light, which passes through the shaping unit 13r, and the blue laser light, which passes through the shaping unit 13b, are combined.

The dichroic mirror 15 is arranged on the optical paths of the laser light (the laser light which is acquired by combining the red laser light and the blue laser light), which is emitted from the dichroic mirror 14, and the green laser light, which passes through the shaping unit 13g, at a prescribed angle. The dichroic mirror 15 causes the combined red and blue laser lights to pass, and causes the green laser light to be reflected. Therefore, the green laser light, which passes through the shaping unit 13g, is combined. The laser light (laser light L), which is acquired by combining the red, green, and blue laser lights, is emitted from the dichroic mirror 15.

As described above, the laser light source unit 10 emits the laser light L which is acquired by combining the red, green, and blue laser lights. Since the beam cross section shape of the laser light and the intensity distribution of the beam cross section of each of the colors is the same, the beam cross section shape of the laser light L, the intensity distribution of the beam cross section, and the polarization direction E are the same as the beam cross section shape of the laser light, the intensity distribution of the beam cross section, and the polarization direction E of each of the colors. That is, the beam cross section shape of the laser light L has a shape in which the vertical sections of the ellipse having the long axis in the vertical direction are decapitated. In addition, the intensity distribution of the laser light L of the beam cross section in the horizontal direction is the substantially Gaussian distribution, the intensity distribution in the vertical direction is a distribution having the substantially top hat shape. Further, the polarization direction E of the laser light L is the X axial direction.

(Emitted-Light-Intensity Control Unit and Polarization Direction Control Unit)

In the embodiment, the laser light L, which is emitted from the laser light source unit 10, is incident into the emitted-light-intensity control unit 20. In addition, the laser light L, which is emitted from the emitted-light-intensity control unit 20, is incident into the polarization direction control unit 25.

The emitted-light-intensity control unit 20 includes a polarization control element 21 and a polarizing plate 22. In the embodiment, the polarization control element 21 is, for example, a Vertical Alignment (VA)-type liquid crystal element. The VA-type liquid crystal element 21 includes two transparent substrates, which include transparent electrodes, a Nematic liquid crystal which is interposed between the transparent electrodes and which has a negative vertical alignment type dielectric anisotropy. The polarizing plate 22 is formed of an aluminum wiring grid polarizing plate.

The polarization direction control unit 25 is, for example, a λ/2 wavelength plate.

The VA-type liquid crystal element 21 and the polarizing plate 22 are arranged in the travelling direction of the laser light L in the order of the VA-type liquid crystal element 21 and the polarizing plate 22. In addition, the transmission axis of the polarizing plate 22 is arranged in the orthogonal direction (Y axial direction) with regard to the polarization direction of the laser light L which is emitted from the laser light source unit 10.

Further, the slow axis of the λ/2 wavelength plate 25 is arranged at 45° with regard to the transmission axis of the polarizing plate 22.

Figure 7:
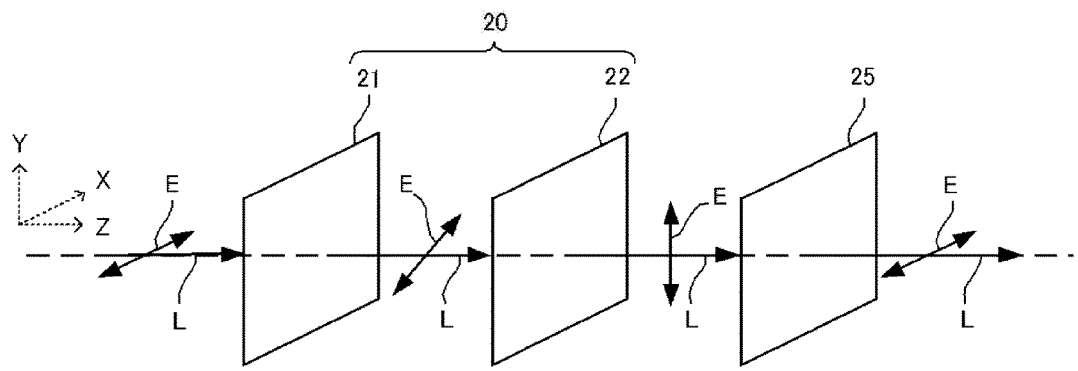
FIG. 7 is a diagram illustrating the change in the polarization direction of a laser light which passes through an emitted-light-intensity control unit and a polarization direction control unit according to the first embodiment of the present invention.

FIG. 7 illustrates the change in the polarization direction E of the laser light L which passes through the emitted-light-intensity control unit 20 and the polarization direction control unit 25.

Since the polarization direction E of the laser light L, which is incident into the VA-type liquid crystal element 21, is the X axial direction, the VA-type liquid crystal element 21 and the polarizing plate 22, which has the transmission axis in the Y axial direction, function as a single normally-black liquid crystal element. That is, when a voltage is not applied to the VA-type liquid crystal element 21, the laser light L, which is incident into the VA-type liquid crystal element 21, maintains a polarization state and is emitted from the VA-type liquid crystal element 21 (as the laser light L in which the polarization direction E is the X axis). The laser light L, which is emitted from the VA-type liquid crystal element 21, is incident into the polarizing plate 22. Since the transmission axis of the polarizing plate 22 is the Y axial direction, it is difficult for the laser light L to pass through the polarizing plate 22.

In contrast, when a voltage is applied to the VA-type liquid crystal element 21, the laser light L, which is incident into the VA-type liquid crystal element 21, changes a polarization state depending on the supplied voltage according to the birefringence of the VA-type liquid crystal element 21, and is emitted from the VA-type liquid crystal element 21. The laser light L, in which the polarization state changes and which is emitted from the VA-type liquid crystal element 21, is incident into the polarizing plate 22. Since the transmission axis of the polarizing plate 22 is the Y axial direction, a part (or all) of the laser light L, in which the polarization state changes, passes through the polarizing plate 22. In this case, the polarization direction E of the laser light L, which passes through the polarizing plate 22, is the Y axial direction. Since the light intensity of the laser light L, which passes through the polarizing plate 22, depends on the voltage which is applied to the VA-type liquid crystal element 21, it is possible for the emitted-light-intensity control unit 20 to control the light intensity of the laser light L.

The laser light L, which passes through the polarizing plate 22, is incident into the λ/2 wavelength plate 25. The slow axis of the λ/2 wavelength plate 25 is arranged at 45° with regard to the transmission axis of the polarizing plate 22, the polarizing surface of the laser light L, which passes through the polarizing plate 22, rotates by 90°. Therefore, the polarization direction E of the laser light L, which passes through the λ/2 wavelength plate 25, is the X axial direction. That is, the λ/2 wavelength plate 25 controls the polarization direction E of the laser light L, changes the polarization direction of the laser light L, which passes through the polarizing plate 22, from the Y axial direction to the X axial direction, and emits the laser light L. As described above, it is possible for the polarization direction control unit (λ/2 wavelength plate) 25 to control the polarization direction E of the laser light L.

Meanwhile, it is preferable that the control characteristic of the polarization direction E of the λ/2 wavelength plate 25 is uniform (low wavelength dependence of phase difference in the λ/2 wavelength plate 25) in a visible light region (substantially 360 to 830 nm). Therefore, it is possible for the λ/2 wavelength plate 25 to equally control the polarization directions E of the laser lights which are respectively emitted from the red LD 11r, the green LD 11g, and the blue LD 11b.

(Scanning Unit)

The scanning unit 30 includes, for example, a Micro Electro Mechanical System (MEMS) scanner. The MEMS scanner (scanning unit) 30 is arranged on the optical path of the laser light L which is emitted from the polarization direction control unit 25.

The MEMS scanner 30 draws and generates a display image M by scanning the laser light L which is emitted from the polarization direction control unit 25. The MEMS scanner 30 forms one pixel of the display image M by continuously causing the mirror surface of the MEMS scanner to tilt in the horizontal direction for approximately 10 ns.

(Refraction Unit)

The refraction unit 40 includes a convex lens or the like. The refraction unit 40 is arranged on the optical path of the laser light L which is scanned by the scanning unit 30. The refraction unit 40 refracts the laser light L, which is scanned by the scanning unit 30 such that the laser light L, which is scanned by the scanning unit 30, is incident into the microlens array 50 at an incident angle (an angle which is made by the normal vector of the microlens array 50 and the laser light L) according to a scanning location.

(Microlens Array)

Figure 8:
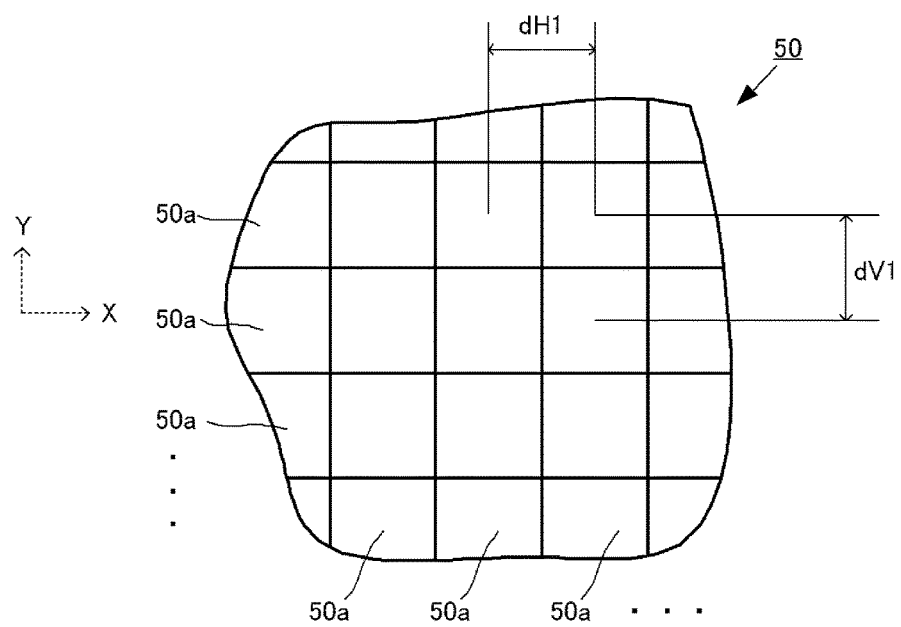
FIG. 8 is a schematic diagram illustrating the configuration of a microlens array according to the first embodiment of the present invention.

As illustrated in FIG. 8, the microlens array 50 includes a plurality of microlenses 50a which are periodically arranged at the pitch of dH1 in the horizontal direction and dV1 in the vertical direction in plane. In addition, the plurality of microlenses 50a are formed such that the interval, the step, or the like between the microlens 50a is minimized. Here, the pitch of microlens array (microlens) is a distance between the centers of adjacent microlens. In the embodiment, it is assumed that the pitch dH1 in the horizontal direction is equal to or larger than the pitch dV1 in the vertical direction (dH1≥dV1). For example, in the microlens array 50, the microlenses 50a, which are rectangles that are long in the horizontal direction, are periodically arranged such that the interval, the step, and the like between the microlenses 50a are minimized.

In addition, in the embodiment, the pitch dH1 of the microlens array 50 in the horizontal direction corresponds to the size of one pixel of the display image M.

The microlens array 50 is arranged such that the optical axis of the microlens 50a, which is located at the center of the microlens array 50, coincides with the center of the beam cross section of the laser light L which is reflected in the mirror surface in a state (stopped state) in which the mirror surface of the MEMS scanner 30 does not tilt.

The laser light L, which is incident into the microlens array 50, is once converged by the microlens 50a, and is diverged. Since microlens array 50 diverges the laser light L, which is used when the scanning unit 30 draws the display image M on the microlens array 50, and thus the microlens array 50 functions as a transmission screen which displays the display image M. The laser light L, which is emitted from the microlens array 50 and is diverged, will be described later.

(Aperture Array)

Figure 9:
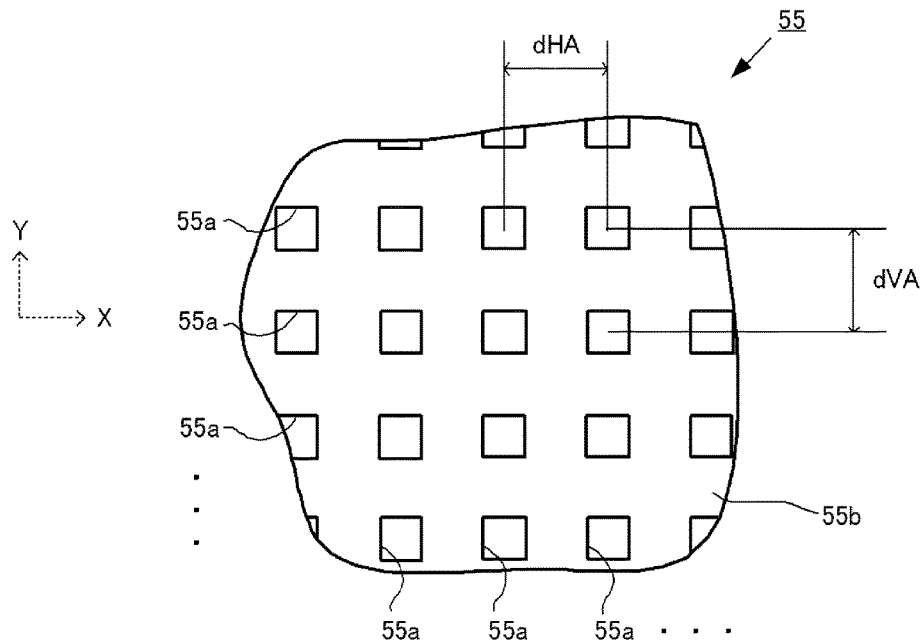
FIG. 9 is a schematic diagram illustrating the configuration of an aperture array according to the first embodiment of the present invention.

As illustrated in FIG. 9, the aperture array 55 includes a plurality of opening sections 55a which are periodically arranged in the horizontal direction and in the vertical direction in plane. Each of the opening sections 55a makes a pair with each of the microlenses 50a of the microlens array 50. The aperture array 55 is manufactured by a photo lithography technology or the like. A region other than the opening sections 55a of the aperture array 55 is a light shielding section 55b. The light shielding section 55b absorbs visible light.

The aperture array 55 is arranged such that the center of the opening section 55a, which is located at the center of the aperture array 55, is located on the optical axis of the microlens 50a which is located at the center of the microlens array 50. In addition, the aperture array 55 and the microlens array 50 are arranged to be separated by a focal distance of the microlens 50a of the microlens array 50.

The size of the opening section 55a of the aperture array 55 is approximately 1/5 to 1/10 of the size of the microlens 50a of the microlens array 50. In addition, the opening sections 55a of the aperture array 55 are arranged at the pitch of dHA in the horizontal direction and dVA in the vertical direction. Here, the pitch of the aperture array (opening section) is a distance between the centers of adjacent opening sections. The pitches dHA and dVA of the aperture array 55 are set such that the laser light L, which is condensed by the microlens 50a that makes a pair with each of the opening sections 55a, is effectively passes therethrough.

In contrast, the light shielding section 55b of the aperture array 55 absorbs visible light. External light, which is incident from the outside of the housing 102 into the housing 102, internal reflection light in the microlens array 50, and the like are absorbed by the light shielding section 55b of the aperture array 55. Therefore, the scanning-type projection device 100 reduces outside light reflection and the internal reflection of the laser light L, and causes the laser light L, which is emitted from the microlens array 50, to be uniform, thereby enabling the virtual image V of the display image M of high display quality to be displayed.

(Planar Mirror and Enlarging Mirror)

The planar mirror 61 is a planar-type full reflection mirror. The planar mirror 61 is arranged on the optical path of laser light L (the display light which expresses the virtual image V of the display image M) which passes through the opening section 55a of the aperture array 55. The planar mirror 61 causes the display light, which expresses the virtual image V of the display image M, to be reflected in the enlarging mirror 62.

The enlarging mirror 62 is, for example, a concave mirror. The enlarging mirror 62 is arranged on the optical path of the display light, which expresses the virtual image V of the display image M and which is reflected by the planar mirror 61, and causes the display light, which expresses the virtual image V of the display image M to be reflected in the windshield 201. Since the enlarging mirror 62 is the concave mirror, the virtual image V of the display image M is the virtual image in which the display image M is enlarged.

The display light, which expresses the virtual image V of the display image M reflected in the enlarging mirror 62, is emitted from the emission unit 101. The display light, which expresses the virtual image V of the display image M and which is emitted from the emission unit 101, is reflected in the windshield 201 and the virtual image V of the display image M is produced on the front side of the windshield 201. Therefore, it is possible for the observer or the like of the vehicle 200 to visually recognize the display image M as the virtual image V in the Eyebox 3 which is a vision.

(Control Unit)

Figure 10:
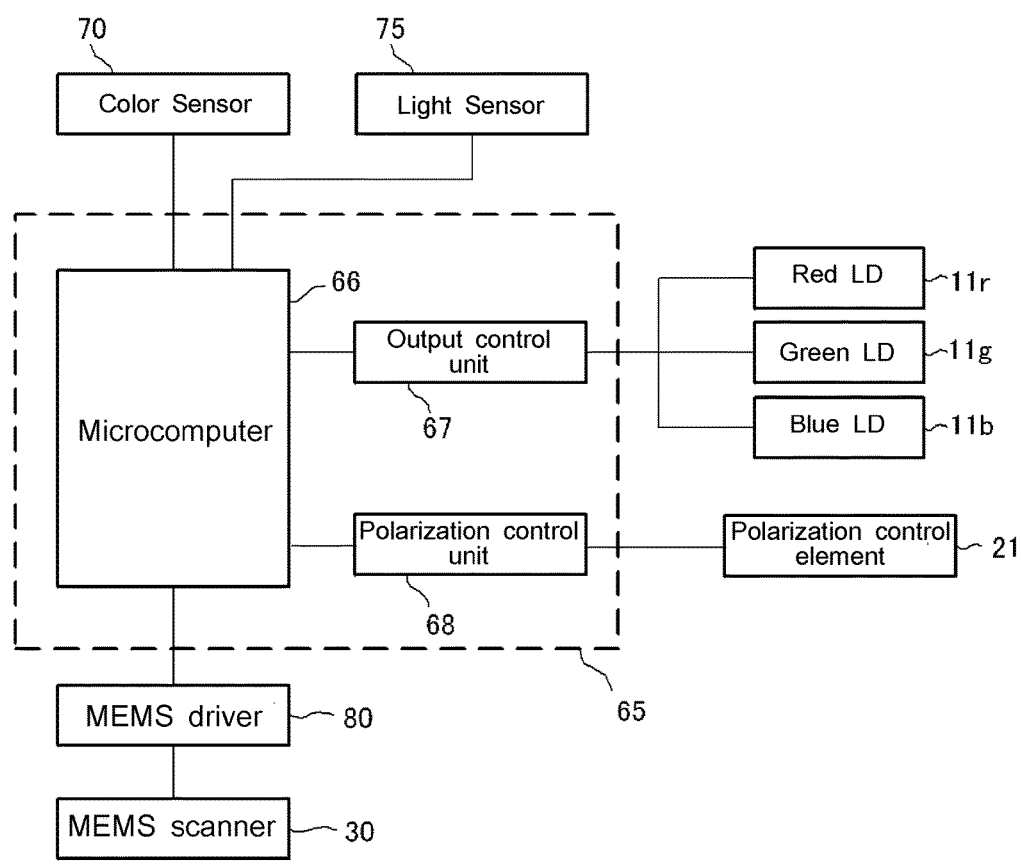
FIG. 10 is a block diagram illustrating the configuration of a control unit according to the first embodiment of the present invention.

The scanning-type projection device 100 further includes a control unit 65. The control unit 65 includes a microcomputer 66, an output control unit 67, a polarization control unit 68, and a Digital to Analog Converter (DAC) which is not shown in the drawing (FIG. 10). The DAC converts analog data, which is received from a color sensor 70 and a light sensor 75, into digital data, and supplies the digital data to the microcomputer 66.

The color sensor 70 is provided, for example, on the surface of the microlens array 50 into which the laser light L is incident (FIG. 2), and detects the light intensity of each of the red, the green, and the blue of the laser light L. The color sensor 70 supplies the detected analog data of the light intensity to the DAC. A location where the color sensor 70 is installed may be an arbitrary location in which the light intensity is detected in a prescribed range.

The light sensor 75 is provided, for example, in the peripheral section of the emission unit 101 (FIG. 2). The light sensor 75 detects the intensity of external light. The light sensor 75 supplies the detected analog data of the intensity of external light to the DAC. A location where the light sensor 75 is installed may be an arbitrary location in which the intensity of external light is detected in a prescribed range.

The microcomputer 66 controls various operations of the scanning-type projection device 100. The microcomputer 66 acquires image data for displaying the display image M from a storage unit, which is not shown in the drawing, through Low Voltage Differential Signal (LVDS) communication or the like. In the storage unit, a prescribed operating program, location data, which indicates the location where the color sensor 70 is installed, or the like is stored in advance.

For example, the microcomputer 66 controls, for example, the operation of the scanning-type projection device 100 based on the stored operating program as below.

a) The microcomputer 66 generates control data. When the microcomputer 66 outputs the generated control data to the output control unit 67, the red, green, and blue LDs 11r, 11g, and 11b are driven through the output control unit 67. The control data, which is generated here, is generated based on the digital data of the light intensity of each of the colors of the laser light L which is received from the color sensor 70 and is converted by the DAC. The control data includes data for controlling the light intensity of the laser light of each of the colors which are emitted from the red, the green, and the blue LDs 11r, 11g, and 11b, or the like.

b) The microcomputer 66 drives the MEMS scanner (scanning unit) 30 through the MEMS driver 80.

c) The microcomputer 66 supplies the control data to the output control unit 67 at prescribed timing, and acquires data of the light intensity from the color sensor 70.

d) The microcomputer 66 generates dimmer data for controlling the VA-type liquid crystal element 21 based on image data in order to acquire luminance of the image data which is acquired from the storage unit.

e) The microcomputer 66 supplies the dimmer data to the polarization control unit 68, and drives the VA-type liquid crystal element 21 through the polarization control unit 68.

The output control unit 67 controls the respective outputs of the red, the green, and the blue LDs 11r, 11g, and 11b based on the control data which is supplied from the microcomputer 66, and drives the red, the green, and the blue LDs 11r, 11g, and 11b.

In addition, the polarization control unit 68 controls the voltage which is applied to the VA-type liquid crystal element 21 according to the dimmer data which is supplied from the microcomputer 66, and adjusts the light intensity of the laser light L (the luminance of the display image M) which is emitted from the emitted-light-intensity control unit 20. For example, when the display image M, in which the luminance is low, is displayed, the red, the green, and the blue LDs 11r, 11g, and 11b emit the laser lights of the respective colors with the light intensity which can be stably emitted, and the light intensity of the laser light L is adjusted by the emitted-light-intensity control unit 20. Therefore, it is possible for the scanning-type projection device 100 to stably display the display image M (virtual image V) in which the luminance is low.

(Laser Light which is Emitted from Microlens Array)

The laser light L, which is incident into the microlens array 50, is condensed by the microlens 50a. The beam diameter of the laser light L, which is incident into the microlens array 50, is determined according to the size of the opening 13ra of the shaping unit 13r of the laser light source unit 10, the size of the opening of the shaping unit 13g, the size of the opening of the shaping unit 13b, and the distance between the shaping units 13r, 13g, and 13b and the microlens array 50. The laser light L, which is condensed by the microlens 50a, is diverged after passing through the opening section 55a of the aperture array 55. The diverged laser light L illuminates the Eyebox 3 through the planar mirror 61, the enlarging mirror 62, and the windshield 201.

Figure 11:
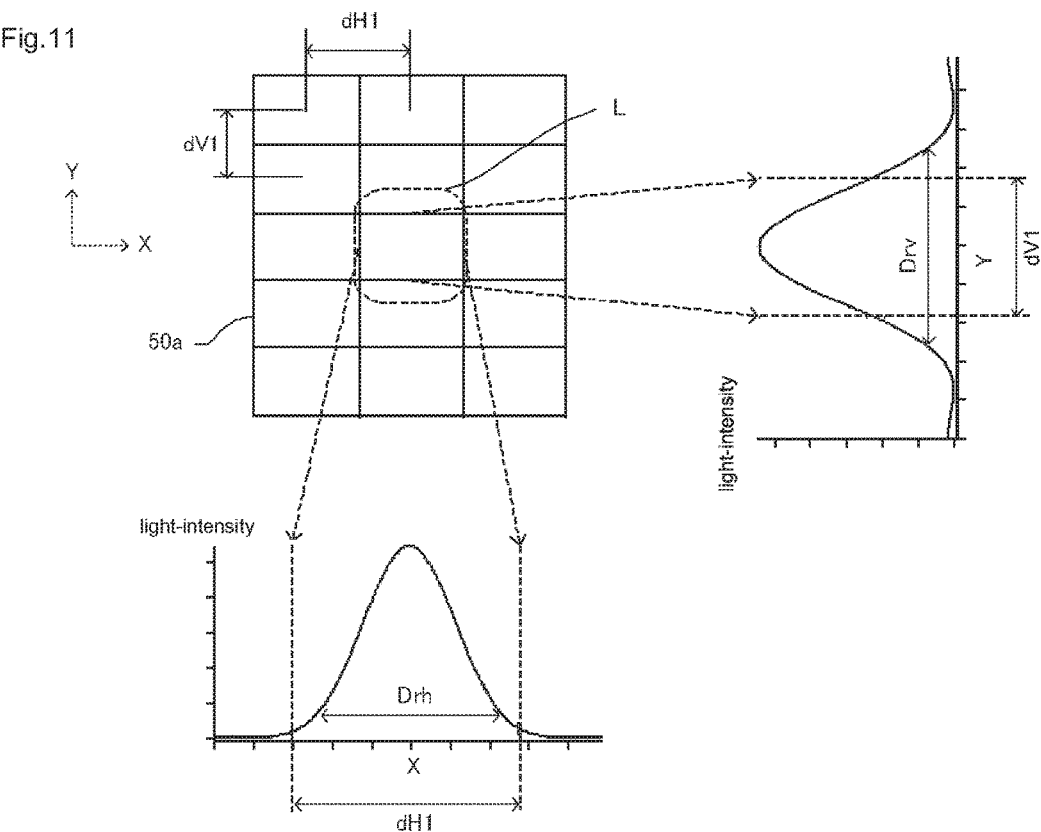
FIG. 11 is a diagram illustrating the beam cross section shape and the intensity distribution of the beam cross section of the laser light which is incident into the microlens array according to the first embodiment of the present invention.

In the embodiment, as illustrated in FIG. 11, the microlens array 50 is irradiated with the laser light L, which is incident into the microlens array 50, such that the beam diameter Drh in the horizontal direction is smaller than the pitch dH1 of the microlens array 50 in the horizontal direction and the beam diameter Drv in the vertical direction is equal to or larger than the pitch dV1 of the microlens array 50 in the vertical direction (Drh<dH1 and Drv≥dV1). Here, the beam diameter of the laser light is the beam diameter of the laser light in a location where the intensity is defined to be $1/e^2$ (13.5%) of the peak intensity of the beam.

(Vertical Direction)

In the embodiment, the beam diameter Drv in the vertical direction is equal to or larger than the pitch dV1 of a first microlens array 40 in the vertical direction, and thus the laser light L is incident into the plurality of microlenses 50a in the vertical direction.

Figure 12:
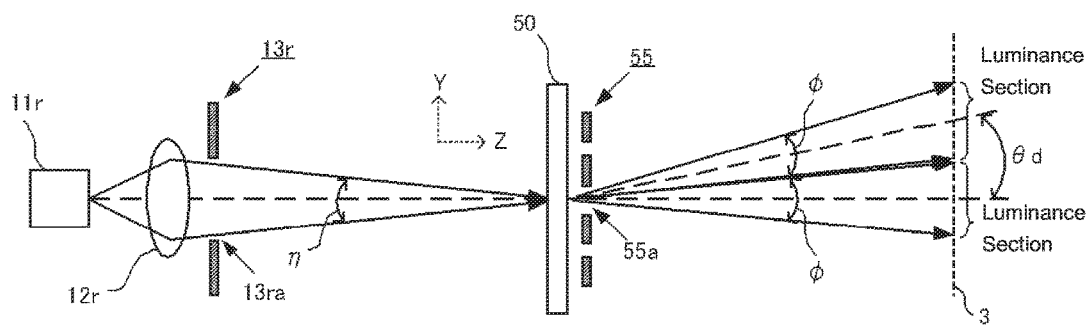
FIG. 12 is a diagram illustrating an interfered laser light (red) which forms the luminance sections of interference fringes in the vertical direction according to the first embodiment of the present invention.

In the embodiment, when the distance or the like between the shaping units 13r, 13g, and 13b of the laser light source unit 10 and the microlens array 50 is optimized, the beam diameter of the interfered laser light L, which forms the luminance sections of the interference fringes on the Eyebox 3, is enlarged or reduced, and the interval between the luminance sections of the interference fringes on the Eyebox is closed. That is, as illustrated in FIG. 12, the diffraction angle θd and the divergence angle φ of the interfered laser light L, which forms the luminance sections, are substantially the same. More specifically, it is possible to assume that the convergence angle η of the laser light L, which is incident into the microlens array 50, is the same as the divergence angle φ of the interfered laser light L which forms the luminance sections. Therefore, the distance between the shaping units 13r, 13g, and 13b and the microlens array 50 and the pitch dV1 of the microlens array 50 in the vertical direction are selected such that the convergence angle η (NA of shaping units 13r, 13g, and 13b) and the diffraction angle θd of the interfered laser light L which forms the luminance sections are substantially the same. For example, in a case of the green laser light, an NA of 0.005 of the shaping unit 13g is selected for a pitch dV1 of 50 μm of the microlens array 50 in the vertical direction.

In addition, it is possible to assume the intensity distribution of the interfered laser light L, which forms the luminance sections, in the vertical direction of the beam cross section as substantially top hat shaped distribution similarly to the laser light L which is emitted from the laser light source unit 10.

Figure 13:
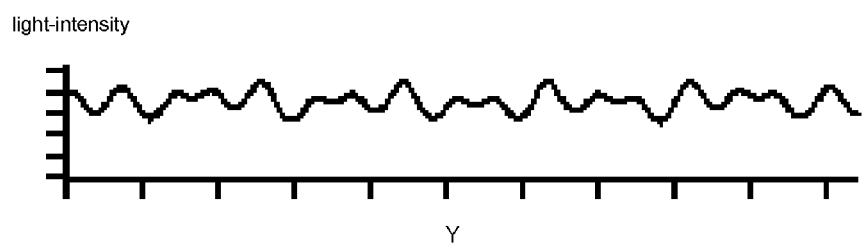
FIG. 13 is a diagram illustrating the intensity distribution in the vertical direction of the beam cross section of the laser light on an Eyebox according to the first embodiment of the present invention.

Therefore, in the embodiment, the distance between the shaping units 13r, 13g, and 13b and the microlens array 50, and the pitch dV1 of the microlens array 50 in the vertical direction are selected and setting is performed such that the interval between the luminance sections of the interference fringes on the Eyebox 3 is equal to or less than the minimum diameter (2 mm) of the human pupil. Therefore, when the pupils of the observer or the like move in the vertical direction in the Eyebox 3, it is possible to suppress luminance unevenness and color unevenness in the Eyebox 3, as illustrated in FIG. 13.

(Horizontal Direction)

The beam diameter Drh of the laser light L in the horizontal direction is smaller than the pitch dH1 of the microlens array 50. In addition, Gaussian distribution is maintained as the intensity distribution of the laser light L of the beam cross section in the horizontal direction. Since the beam diameter Drh of the laser light L in the horizontal direction is smaller than the pitch dH1 of the microlens array 50, the interference of the laser light L is not generated in the horizontal direction.

Figure 14:
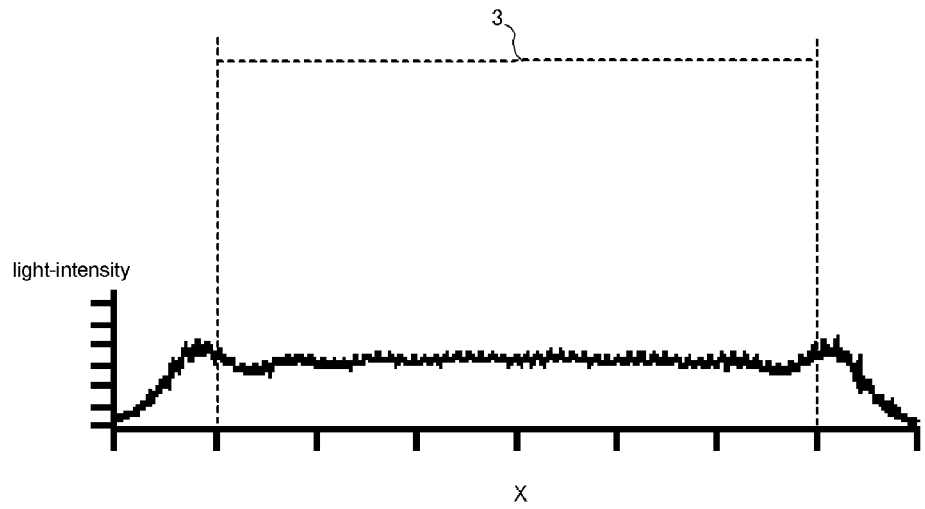
FIG. 14 is a diagram illustrating the intensity distribution in the horizontal direction of the beam cross section of the laser light on the Eyebox according to the first embodiment of the present invention.

In the embodiment, the MEMS scanner 30 causes the mirror surface of the MEMS scanner 30 to tilt continuously in the horizontal direction during approximately 10 ns, and forms one pixel of the display image M. Therefore, the laser light L, which is incident into the microlens array 50, moves as much as one microlens 50a in the horizontal direction in order to form one pixel. In this case, while the laser light L moves in the horizontal direction, the intensity distribution of the laser light L in the horizontal direction of the beam cross section moves in the Eyebox 3. When the intensity distribution of the beam cross section in the horizontal direction is integrated in time when the laser light L moves as much as one microlens 50a (as much as one pixel), it is possible to acquire substantially top hat-shaped intensity distribution in the horizontal direction of the Eyebox 3 (FIG. 14). Therefore, in the embodiment, when the pupils of the observer or the like move in the horizontal direction in the Eyebox 3, it is possible to suppress the luminance unevenness and the color unevenness.

As described above, in the embodiment, the horizontal direction and the vertical direction in the Eyebox 3 is irradiated with the laser light L (the display light which expresses the virtual image V of the display image M) in which the luminance unevenness and the color unevenness are suppressed. In addition, in the embodiment, since the microlens array 50 diverges the laser light L, it is possible to suppress spectrum from being generated.

(Polarization Direction of Laser Light which is Incident into Windshield)

Since the polarization direction E of the laser light L, which is emitted from the polarization direction control unit 25, is the X axial direction, the polarization direction E of the laser light L, which is incident into the windshield 201, is the X axial direction (FIGS. 1 and 2). That is, the polarization direction E of the laser light L, which is incident into the windshield 201, is the vertical direction of the incident surface of the windshield 201 (the laser light L corresponds to s-polarization). When polarization light is incident into a refraction index interface, the s-polarization has higher reflectance at the refraction index interface than the p-polarization, the laser light L according to the embodiment is reflected with high reflectance by the windshield 201.

For example, in the embodiment, when the refraction index of the windshield 201 is 1.5 and an incident angle of the laser light L toward the windshield 201 is 70°, the reflectance of the laser light L (s-polarization) in the windshield 201 is 30.0%. In contrast, in a head up display, which does not include the polarization direction control unit ($\lambda/2$ wavelength plate) 25 according to the embodiment, the laser light (p-polarization), which has the polarization direction E that is the horizontal direction of the incident surface of the windshield 201, is incident into the windshield 201, and thus the reflectance of the laser light (p-polarization) in the windshield 201 is 4.2%.

Therefore, when the polarization direction control unit 25 adjusts the polarization direction E of the laser light (display light) which is incident into the windshield 201, it is possible for the scanning-type projection device 100 to display the virtual image V of the high-luminance display image M.

As described above, when the scanning-type projection device 100 according to the embodiment sets the beam shape of the laser light L and the pitches dV1 and dH1 of the microlens array 50, it is possible to suppress the luminance unevenness and the color unevenness. In addition, when the scanning-type projection device 100 controls a voltage which is applied to the VA-type liquid crystal element (polarization control element) 21 of the emitted-light-intensity control unit 20, it is possible to stably display the virtual image V of the display image M, in which the luminance is low. Further, when the laser light L passes through the $\lambda/2$ wavelength plate (polarization direction control unit) 25, the scanning-type projection device 100 maintains the settings of the beam shape of the laser light L and the pitches dV1 and dH1 of the microlens array 50 and rotates the polarizing surface of the laser light L by 90°, and thus it is possible to display the virtual image V of the high-luminance display image M.

Meanwhile, a polarizing plate, which has a transmission axis that is parallel to the polarization direction E of the laser light L emitted from the laser light source unit 10, may be arranged between the laser light source unit 10 and the emitted-light-intensity control unit 20. When the polarizing plate, which has the transmission axis that is parallel to the polarization direction E of the laser light L, is arranged between the laser light source unit 10 and the emitted-light-intensity control unit 20, it is possible to increase the polarization degree of the laser light L which is incident into the VA-type liquid crystal element 21. In addition, the $\lambda/2$ wavelength plate 25 may only be arranged in a location, into which the laser light L that is emitted from the polarizing plate 22, is incident. For example, it is possible to arrange the $\lambda/2$ wavelength plate 25 between the scanning unit 30 and the refraction unit 40 on the optical path of the laser light L or between the aperture array 55 and the planar mirror 61.

(Second Embodiment)

Figure 15:
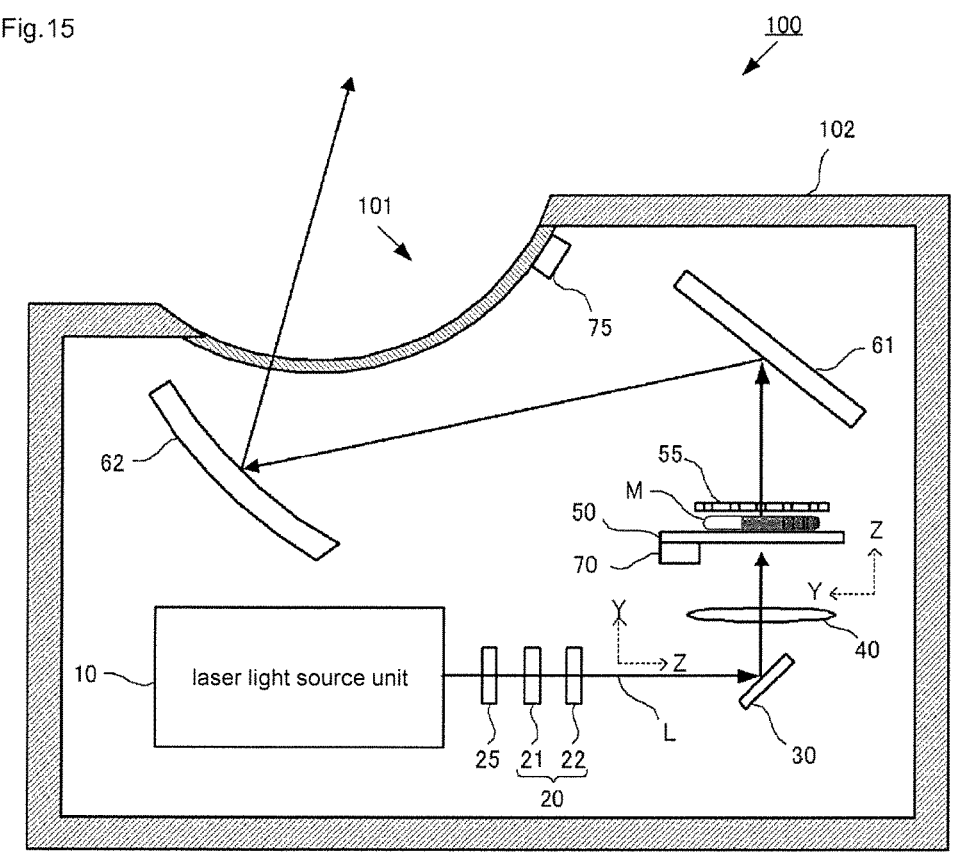
FIG. 15 is a schematic sectional diagram illustrating the configuration of a scanning-type projection device according to a second embodiment of the present invention.

A second embodiment will be described with reference to FIG. 15. In the embodiment, the arrangement of the $\lambda/2$ wavelength plate (polarization direction control unit) 25 is different from that of the first embodiment. The other configurations are the same as those of the first embodiment.

In the embodiment, the VA-type liquid crystal element 21, the polarizing plate 22, and the $\lambda/2$ wavelength plate 25 are arranged in order of the $\lambda/2$ wavelength plate 25, the VA-type liquid crystal element 21, and the polarizing plate 22 in the travelling direction of the laser light L.

In addition, the slow axis of the $\lambda/2$ wavelength plate 25 is arranged at 45° for the polarization direction E (X axial direction) of the laser light L which is emitted from the laser light source unit 10. Further, the transmission axis of the polarizing plate 22 is arranged to be parallel to the polarization direction E (X axial direction) of the laser light L which is emitted from the laser light source unit 10.

In the embodiment, the laser light L, which is emitted from the laser light source unit 10, is first incident into the $\lambda/2$ wavelength plate 25. Since the slow axis of the $\lambda/2$ wavelength plate 25 is arranged at 45° for the polarization direction E (X axial direction) of the laser light L, the polarizing surface of the laser light L, which passes through the $\lambda/2$ wavelength plate 25, rotates by 90°. That is, the polarization direction E of the laser light L, which passes through the $\lambda/2$ wavelength plate 25, is the Y axial direction.

The laser light L, which passes through the $\lambda/2$ wavelength plate 25, is incident into the emitted-light-intensity control unit 20 (the VA-type liquid crystal element 21 and the polarizing plate 22). Since the polarization direction E of the laser light L, which passes through the $\lambda/2$ wavelength plate 25, is the Y axial direction, the VA-type liquid crystal element 21 and the polarizing plate 22, which has the transmission axis in the X axial direction, function as one normally-black liquid crystal element. Therefore, similarly to the first embodiment, it is possible for the emitted-light-intensity control unit 20 to control the light intensity of the laser light L by controlling a voltage which is applied to the VA-type liquid crystal element 21. Here, since the polarizing plate 22 has the transmission axis in the X axial direction, the polarization direction E of the laser light L, which is emitted from the emitted-light-intensity control unit 20, is the X axial direction.

Therefore, in the embodiment, when the polarization direction control unit 25 adjusts the polarization direction E of the laser light (display light), which is incident into the windshield 201, it is possible for the scanning-type projection device 100 to display the virtual image V of the high-luminance display image M. In addition, it is possible to acquire the other advantages of the first embodiment, similarly to the first embodiment.

(Third Embodiment)

Figure 16:
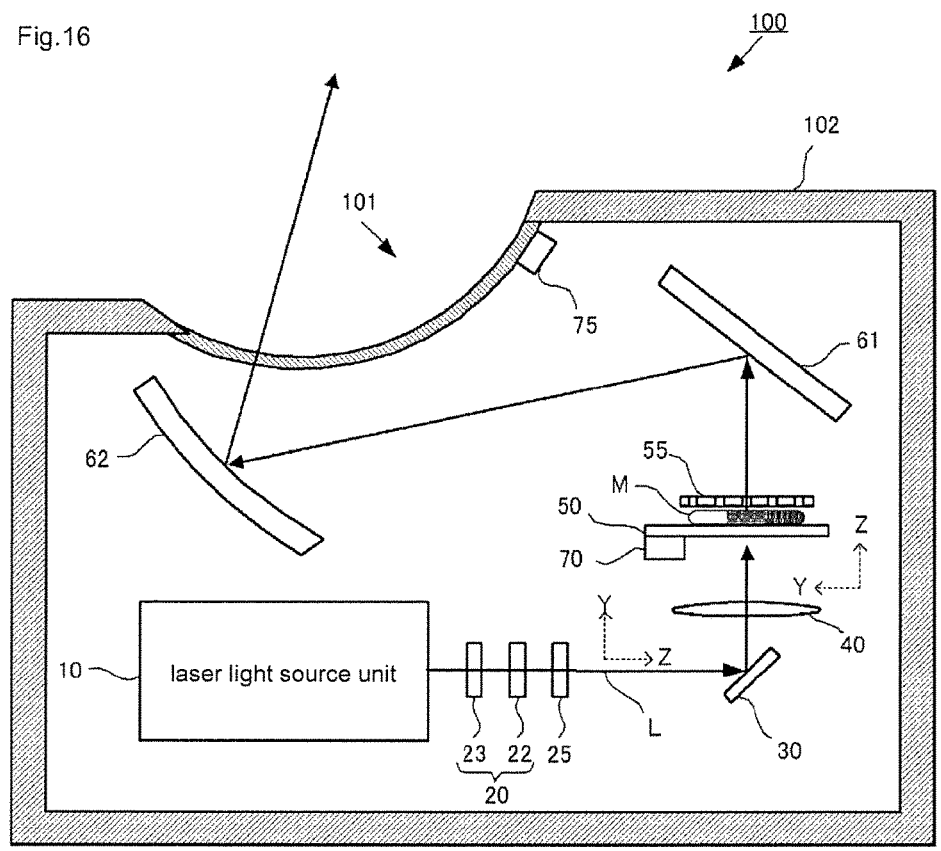
FIG. 16 is a schematic sectional diagram illustrating the configuration of a scanning-type projection device according to a third embodiment of the present invention.

A third embodiment will be described with reference to FIGS. 16 and 17. In the embodiment, the configuration of the emitted-light-intensity control unit 20 is different from that of the first embodiment. The other configurations are the same as those of the first embodiment.

In the embodiment, the emitted-light-intensity control unit 20 includes a 90°-twist TN-type liquid crystal element 23 and a polarizing plate 22. The 90°-twist TN-type liquid crystal element 23 includes two transparent substrates which have transparent electrodes, and Nematic liquid crystal which is interposed between the transparent electrodes and in which 90°-twist oriented dielectric anisotropy is positive, and the like. The 90°-twist TN-type liquid crystal element 23 and the polarizing plate 22 are sequentially arranged in order of the 90°-twist TN-type liquid crystal element 23 and the polarizing plate 22 in the travelling direction of the laser light L.

The 90°-twist TN-type liquid crystal element 23 is arranged such that the orientation direction of the liquid crystal on a surface, into which the laser light L that is emitted from the laser light source unit 10 is incident, is parallel to the polarization direction E (X axial direction) of the laser light L. The orientation direction of the liquid crystal on the surface, from which the laser light L of the 90°-twist TN-type liquid crystal element 23 is emitted, is vertically arranged for the polarization direction E of the laser light L (Y axial direction). In addition, the transmission axis of the polarizing plate 22 is arranged in the orthogonal direction (Y axial direction) for the polarization direction of the laser light L which is emitted from the laser light source unit 10. Further, the slow axis of the λ/2 wavelength plate 25 is arranged at 45° for the transmission axis of the polarizing plate 22.

Figure 17:
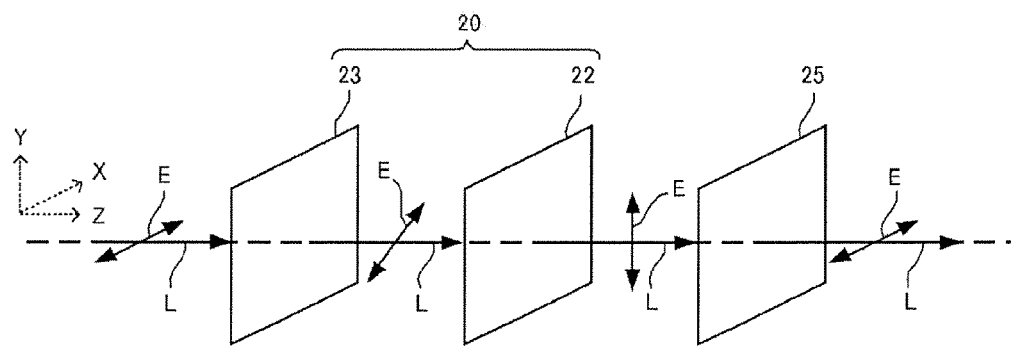
FIG. 17 is a diagram illustrating the change in the polarization direction of a laser light which passes through an emitted-light-intensity control unit and a polarization direction control unit according to the third embodiment of the present invention.

FIG. 17 illustrates the change in polarization direction E of the laser light L which passes through the emitted-light-intensity control unit 20 and the polarization direction control unit 25.

Since the polarization direction E of the laser light L, which is incident into the 90°-twist TN-type liquid crystal element 23, is the X axial direction, the 90°-twist TN-type liquid crystal element 23 and the polarizing plate 22, which has the transmission axis in the Y axial direction, function as one normally-white liquid crystal element. Therefore, it is possible for the emitted-light-intensity control unit 20 to control the light intensity of the laser light L according to a voltage which is applied to the 90°-twist TN-type liquid crystal element 23.

In the embodiment, the polarization direction E of the laser light L, which passes through the polarizing plate 22, is the Y axial direction. The laser light L, which passes through the polarizing plate 22, is incident into the λ/2 wavelength plate 25. Since the slow axis of the λ/2 wavelength plate 25 is arranged at 45° for the transmission axis of the polarizing plate 22, the polarizing surface of the laser light L, which passes through the polarizing plate 22, rotates by 90°. Therefore, the polarization direction E of the laser light L, which passes through the λ/2 wavelength plate 25, is the X axial direction (FIG. 17). That is, the λ/2 wavelength plate 25 controls the polarization direction E of the laser light L, changes the polarization direction of the laser light L, which passes through the polarizing plate 22, from the Y axial direction to the X axial direction, and emits the laser light L.

As described above, it is possible for the emitted-light-intensity control unit 20 to control the light intensity of the laser light L.

In addition, since the polarization direction E of the laser light L, which is emitted from the λ/2 wavelength plate 25 and is incident into the windshield 201, is the X axial direction, it is possible to acquire the same advantage as in the first embodiment in the embodiment.

Meanwhile, in the embodiment, a polarizing plate, which has a transmission axis that is parallel to the polarization direction E of the laser light L emitted from the laser light source unit 10, may be arranged between the laser light source unit 10 and the emitted-light-intensity control unit 20. In addition, similarly to the first embodiment, the λ/2 wavelength plate 25 may only be arranged in a location into which the laser light L that is emitted from the polarizing plate 22 is incident. Further, similarly to the second embodiment, the λ/2 wavelength plate 25, the 90°-twist TN-type liquid crystal element 23, and the polarizing plate 22 may be sequentially arranged in the travelling direction of the laser light L. In this case, the 90°-twist TN-type liquid crystal element 23 and the polarizing plate 22 are arranged so as to function as one normally-white liquid crystal element.

According to the scanning-type projection device 100, which is described in the embodiment, it is possible to provide the scanning-type projection device 100 which stably displays a display image, in which the luminance is low, and which displays the display image without unevenness of spectrum and luminance. The scanning-type projection device 100 is realized using the following configurations.

The scanning-type projection device 100 emits the display light to the projection surface and projects the display image M expressed by the display light as the virtual image V on the projection surface when the display light is reflected in the projection surface. The scanning-type projection device 100 includes the laser light sources 11r, 11g, and 11b that emit the laser light L; the emitted-light-intensity control unit 20 that is located on the optical path of the laser light L, which is emitted from the laser light sources 11r, 11g, and 11b, and that controls light intensity of the laser light L which is emitted from the laser light sources 11r, 11g, and 11b; a polarization direction control unit 25 that is located on the optical path of the laser light L, which is emitted from the laser light sources 11r, 11g, and 11b, and that controls the polarization direction E of the laser light L which is emitted from the laser light sources 11r, 11g, and 11b; a scanning unit 30 that scans the laser light L, which is emitted from the laser light sources 11r, 11g, and 11b, and that generates the display image M; and a divergence unit 50 into which the laser light L scanned by the scanning unit 30 is incident. The emitted-light-intensity control unit 20 includes the polarization control elements 21 and 23 which control the polarization states of the laser light L, and the polarizing plate 22 to which the laser light L emitted from the polarization control element 21 is incident, and the polarization direction control unit 25 adjusts the polarization direction E of the display light, which is incident into the projection surface, by controlling the polarization direction E of the laser light L which is emitted from the emitted-light-intensity control unit 20.

The divergence unit 50 may include a microlens array 50 in which a plurality of microlenses 50a are arranged.

The pitch dV1 of the microlens array 50 in the horizontal direction may be larger than a beam diameter Drh of the laser light L, which is incident into the microlens array 50, in the horizontal direction, and the pitch dV1 of the microlens array in the vertical direction may be equal to or smaller than the beam diameter Dry of the laser light L, which is incident into the microlens array 50, in the vertical direction.

The polarization direction control unit 25 may rotate the polarizing surface of the laser light L which is emitted from the laser light sources 11r, 11g, and 11b by odd times of 90°.

The emitted-light-intensity control unit 20 may be arranged in each color optical system of the laser light source unit 10. For example, the emitted-light-intensity control unit 20 may be arranged between each of the shaping units 13r, 13g, and 13b and each of the dichroic mirrors 14 and 15 one by one. In this case, it is possible to adjust each color laser light intensity and to adjust the color balance of the display image M (virtual image V) using the emitted-light-intensity control unit 20.

In addition, it is possible to arrange the polarization direction control unit 25 in an arbitrary location of the optical path between the laser light sources 11r, 11g, and 11b and the emission unit 101.

In the first to third embodiments, the λ/2 wavelength plate 25 may be replaced by the 90°-twist TN-type liquid crystal element. It is possible to rotate the polarizing surface of the laser light L by 0 to 90° by controlling a voltage which is applied to the 90°-twist TN-type liquid crystal element. In this case, it is possible to adjust the polarization direction E of the laser light L and to realize higher luminance display in accordance with the display location of the virtual image V or the radius of curvature of the windshield 201.

In the above description, the descriptions of unimportant well-known technical items are appropriately omitted in order to easily understand the present invention.

INDUSTRIAL APPLICABILITY

It is possible to apply the present invention as a scanning-type projection device which displays an image to an observer by scanning a laser light and projecting the image onto a prescribed location.

REFERENCE SIGNS LIST 1 eyes of observer
3 Eyebox
10 laser light source unit
11r, 11g, 11b laser diode
12r, 12g, 12b condensing lens
13r, 13g, 13b shaping unit
13ra opening of shaping unit
14 dichroic mirror
15 dichroic mirror
20 emitted-light-intensity control unit
21 polarization control element (VA-type liquid crystal element)
22 polarizing plate
23 90°-twist TN-type liquid crystal element
25 polarization direction control unit (λ/2 wavelength plate)
30 scanning unit (MEMS scanner)
40 refraction unit
50 microlens array (divergence unit)
50 microlens in microlens array
55 aperture array
55a opening section of aperture array
55b light shielding section of aperture array
61 planar mirror
62 enlarging mirror
65 control unit
66 microcomputer
67 output control unit
68 polarization control unit
70 color sensor
75 light sensor
80 MEMS driver
100 scanning-type projection device
101 emission unit
102 housing
200 vehicle
201 windshield
dH1 pitch of microlens array in horizontal direction
dV1 pitch of microlens array in vertical direction
Drh beam diameter of laser light in horizontal direction
Dry beam diameter of laser light in vertical direction
L laser light
M display image
V virtual image
θd diffraction angle of interfered laser light which forms luminance sections
φ divergence angle of interfered laser light which forms luminance sections
η convergence angle of laser light

The invention claimed is:

1. A scanning-type projection device, which emits a display light to a projection surface and projects a display image expressed by the display light as a virtual image on the projection surface when the display light is reflected in the projection surface, the scanning-type projection device comprising:
a laser light source that emits a laser light;
an emitted-light-intensity control unit that is located on the optical path of the laser light which is emitted from the laser light source, and that controls light intensity of the laser light which is emitted from the laser light source;
a polarization direction control unit that is located on the optical path of the laser light which is emitted from the laser light source, and that controls a polarization direction of the laser light which is emitted from the laser light source;
a scanning unit that scans the laser light which is emitted from the laser light source, and that generates the display image; and
a microlens array to which the laser light scanned by the scanning unit is incident, and including a plurality of microlenses periodically arranged at a first pitch in a horizontal direction and a second pitch in vertical direction, where the first pitch is larger than the second pitch, and wherein the emitted-light-intensity control unit includes a polarization control element which controls a polarization state of the laser light, and a polarizing plate into which the laser light emitted from the polarization control element is incident, and wherein the polarization direction control unit is configured to adjust the polarization direction of the display light to the horizontal direction of the microlens array, which is incident into the projection surface, by controlling the polarization direction of the laser light which is emitted by the emitted-light-intensity control unit.

2. The scanning-type projection device according to claim 1, wherein a pitch of the microlens array in a horizontal direction is larger than a beam diameter of the laser light, which is incident into the microlens array, in the horizontal direction, and wherein a pitch of the microlens array in a vertical direction is equal to or smaller than the beam diameter of the laser light, which is incident into the microlens array, in the vertical direction.

3. The scanning-type projection device according to claim 2, wherein the polarization direction control unit rotates a polarizing surface of the laser light which is emitted from the laser light source by odd times of 90°.

4. The scanning-type projection device according to claim 1, wherein the polarization direction control unit rotates a polarizing surface of the laser light which is emitted from the laser light source by odd times of 90°.

* * * * *